(12) United States Patent
Lehureau

(10) Patent No.: US 7,149,173 B2
(45) Date of Patent: Dec. 12, 2006

(54) MEDIUM FOR RECORDING OPTICALLY READABLE DATA, METHOD FOR MAKING SAME AND OPTICAL SYSTEM REPRODUCING SAID DATA

(75) Inventor: Jean-Claude Lehureau, Sainte Genevieve des Bois (FR)

(73) Assignee: Thales, Paris (FR)

( * ) Notice: Subject to any disclaimer, the term of this patent is extended or adjusted under 35 U.S.C. 154(b) by 636 days.

(21) Appl. No.: 10/399,038

(22) PCT Filed: Oct. 17, 2001

(86) PCT No.: PCT/FR01/03215

§ 371 (c)(1),
(2), (4) Date: Apr. 17, 2003

(87) PCT Pub. No.: WO02/33701

PCT Pub. Date: Apr. 25, 2002

(65) Prior Publication Data

US 2004/0027964 A1    Feb. 12, 2004

(30) Foreign Application Priority Data

Oct. 17, 2000  (FR) .................................. 00 13288

(51) Int. Cl.
*G11B 7/135* (2006.01)
*G11B 7/24* (2006.01)

(52) U.S. Cl. .................... 369/94; 369/100; 369/283

(58) Field of Classification Search ............. 369/283, 369/100
See application file for complete search history.

(56) References Cited

U.S. PATENT DOCUMENTS 3,913,076 A   10/1975  Lehureau et al.

(Continued)

FOREIGN PATENT DOCUMENTS

EP   0 440 214   8/1991

(Continued)

*Primary Examiner*—Wayne Young
*Assistant Examiner*—Van T. Pham
(74) *Attorney, Agent, or Firm*—Oblon, Spivak, McClelland, Maier & Neustadt, P.C.

(57) ABSTRACT

The invention concerns a recording medium for optically readable data of the multilayer type, a method for making same and an optical system for reproducing said data for reading the medium.

The medium (Sb) comprises a stack of layers (C1 to CN) whereof the interfaces constitute planes (P1 to PN) bearing slightly phase-shifting information elements. Said planes generate a relatively significant disturbance of the transmitted beam while diffracting only a very small part of the light passing through them. The reading beam (FI) is focused on the bearing plane and reading is performed by transmission. The disturbances caused by the neighboring defocused layers are eliminated by far field detection of only the low spatial frequencies in the transmitted beam.

The invention is particularly useful for very high capacity data optical storage.

32 Claims, 9 Drawing Sheets

U.S. PATENT DOCUMENTS

| | | |
|---|---|---|
| 3,919,698 A | 11/1975 | Bricot et al. |
| 3,971,002 A | 7/1976 | Bricot et al. |
| 4,023,033 A | 5/1977 | Bricot et al. |
| 4,025,784 A | 5/1977 | Lehureau et al. |
| 4,037,251 A | 7/1977 | Bricot et al. |
| 4,038,524 A | 7/1977 | Puech et al. |
| 4,039,764 A | 8/1977 | Bricot et al. |
| 4,059,841 A | 11/1977 | Bricot et al. |
| 4,079,247 A | 3/1978 | Bricot et al. |
| 4,079,248 A | 3/1978 | Lehureau et al. |
| 4,128,309 A | 12/1978 | Lehureau et al. |
| 4,138,663 A | 2/1979 | Lehureau et al. |
| 4,139,263 A | 2/1979 | Lehureau et al. |
| 4,142,208 A | 2/1979 | Oprandi et al. |
| 4,143,402 A | 3/1979 | Bricot et al. |
| 4,171,879 A | 10/1979 | Bricot et al. |
| 4,176,277 A | 11/1979 | Bricot et al. |
| 4,199,783 A | 4/1980 | Huignard et al. |
| 4,203,133 A | 5/1980 | Bricot et al. |
| 4,275,275 A | 6/1981 | Bricot et al. |
| 4,275,428 A | 6/1981 | Lehureau |
| 4,308,545 A | 12/1981 | Lehureau et al. |
| 4,321,634 A | 3/1982 | Lehureau |
| 4,334,300 A | 6/1982 | Arquie et al. |
| 4,380,016 A | 4/1983 | Lehureau et al. |
| 4,381,556 A | 4/1983 | Bourdon et al. |
| 4,405,862 A | 9/1983 | Bricot et al. |
| 4,405,994 A | 9/1983 | Cornet et al. |
| 4,551,733 A | 11/1985 | Cornet et al. |
| 4,566,092 A | 1/1986 | Gerard et al. |
| 4,586,165 A | 4/1986 | Cornet et al. |
| 4,791,514 A | 12/1988 | Huijer et al. |
| 4,827,218 A | 5/1989 | Meunier et al. |
| 4,942,490 A | 7/1990 | Lehureau |
| 4,949,198 A | 8/1990 | Huijer et al. |
| 5,025,341 A | 6/1991 | Bousquet et al. |
| 5,050,027 A | 9/1991 | Meunier et al. |
| 5,067,230 A | 11/1991 | Meunier et al. |
| 5,089,923 A | 2/1992 | Lehureau |
| 5,093,174 A * | 3/1992 | Suzuki et al. ............ 428/823.2 |
| 5,124,869 A | 6/1992 | Lehureau |
| 5,125,052 A | 6/1992 | Lehureau et al. |
| 5,134,516 A | 7/1992 | Lehureau et al. |
| 5,157,641 A | 10/1992 | Lehureau |
| 5,168,485 A | 12/1992 | Lehureau et al. |
| 5,172,368 A | 12/1992 | Lehureau |
| 5,182,781 A | 1/1993 | Lehureau et al. |
| 5,218,595 A | 6/1993 | Lehureau et al. |
| 5,229,874 A | 7/1993 | Lehureau et al. |
| 5,258,969 A | 11/1993 | Refregier et al. |
| 5,272,551 A | 12/1993 | Lehureau et al. |
| 5,337,172 A | 8/1994 | Lehureau |
| 5,347,380 A | 9/1994 | Lehureau |
| 5,349,400 A | 9/1994 | Kaplan et al. |
| 5,392,181 A | 2/1995 | Lehureau et al. |
| 5,396,482 A | 3/1995 | Lehureau |
| 5,459,619 A | 10/1995 | Colineau et al. |
| 5,566,982 A | 10/1996 | Lehureau et al. |
| 5,657,304 A | 8/1997 | Lehureau |
| 5,659,536 A | 8/1997 | Maillot et al. |
| 5,671,106 A | 9/1997 | Lehureau |
| 5,745,329 A | 4/1998 | Lehureau |
| 5,801,794 A | 9/1998 | Lehureau et al. |
| 5,872,764 A | 2/1999 | Lehureau et al. |
| 5,880,914 A | 3/1999 | Lehureau |
| 5,936,484 A | 8/1999 | Dolfi et al. |
| 5,973,890 A | 10/1999 | Lehureau et al. |
| 6,014,192 A | 1/2000 | Lehureau et al. |
| 6,091,697 A | 7/2000 | Le Carvennec et al. |
| 6,157,471 A | 12/2000 | Bignolles et al. |
| 6,288,805 B1 | 9/2001 | Huignard et al. |
| 6,324,155 B1 * | 11/2001 | Maeda ................... 369/275.1 |
| 6,384,974 B1 | 5/2002 | Joubert et al. |
| 6,577,561 B1 | 6/2003 | Pirot et al. |
| 6,788,644 B1 * | 9/2004 | Braat ..................... 369/275.4 |

FOREIGN PATENT DOCUMENTS

| | | |
|---|---|---|
| EP | 0 729 142 | 8/1996 |
| FR | 2 271 617 | 12/1975 |
| WO | 00 17867 | 3/2000 |

* cited by examiner

MEDIUM FOR RECORDING OPTICALLY READABLE DATA, METHOD FOR MAKING SAME AND OPTICAL SYSTEM REPRODUCING SAID DATA

This application is a 371 of PCT/FR01/0315 Oct. 17, 2001.

The invention relates to a recording medium for optically readable data of the multilayer type, a method for making same and an optical system for reproducing said data for reading such a medium.

The recording of data has evolved rapidly since the early years of information technology and calculators. The technology that has been in force until now has been magnetic recording, including hard disc drives and floppy discs. A first major limitation appeared when applications began to require volumes of data which were incompatible with the possibilities offered by floppy discs (dozens of 1.4 Mb discs required for an application, for example). In the meantime a new alternative had been developed, optical recording, which was first used in audio recording applications (compact disc (CD)), and then came to resolve the problems of magnetic floppy discs (CD-ROM) thanks to a greatly superior storage capacity, which has improved still further with the appearance of DVD discs.

For hard discs, there remain possibilities for considerable growth in magnetic recording, but this should reach its physical limits within around 15 years. Forecasts for the densities of recording required but which magnetic recording would probably not be able to meet in time show that, in less than ten years, there will be a need for memory media of 100 Gb or more.

Optical recording, as it currently exists, uses optically readable data-bearing discs obtained by engraving diffracting elements (for a CD) onto a reflective layer. These diffracting elements have a thickness of around $\lambda/6$ ($\lambda$ being the wavelength of the laser source used) so as to give them maximum contrast (optical path difference $2ne=\lambda/2$). The progress that can be foreseen in the density of recorded data involves the use of shorter wavelengths (blue laser sources, but ultraviolet can hardly be used due to the disadvantages of the generally polymeric nature of the material used for the discs), greater numerical aperture or improved signal processing. The perspectives are limited, however. Furthermore, it is known that a few superposed layers can be read by only coating each diffracting relief bearer plane with a slightly reflective layer. However, for reasons of energy, it is only possible to superpose a low number of layers. If we assume, for example, that the first layer has a reflectivity of 3%, the second would require an increased reflectivity of 6%, the next one 12.5%, and so on. It is clear that less than 20 layers can be superposed. Added to this there is the fact that the reflective layers show a certain absorption which further reduces the possibilities. Even if, in the laboratory, it has been possible to make a stack of around ten layers work, it is known that currently superposing even just two layers in DVD format causes industrial problems.

To resolve these problems, the Applicant moved away from the idea of perfecting a reflective layer structure derived from the CD and imagined a structure in which each layer is read in transmission through a pattern of slightly phase-shifting information elements. The invention thus allows a relatively significant disturbance of the light beam crossing a data bearer plane while diffracting only a very small part of the light. In principle, the invention would therefore allow the stacking of a few thousand layers and, realistically and without any technical implementation problems, the realization of a medium with around a hundred layers which would in time, with the blue source DVD type reading technology, allow storage capacities of around a terabyte.

According to the invention, a medium is planned for recording optically readable data obtained by engraving diffracting elements on at least one data bearer plane, characterized in that said medium is formed by superposing slightly phase-shifting information element bearer planes, each separated from the next plane by a near-transparent layer, said medium being readable in transmission using a light beam focused on the plane to be read and crossing the other planes and said layer.

According to a characteristic of the invention, the phase shift introduced by said information elements is less than a few tenths of a radian.

According to another advantageous characteristic of the invention, each of said data bearer planes is made at the interface between two dielectric layers of slightly differing refractive indices, these indices differing by a few percent, and said information elements are made up of the reliefs of said interface.

Thanks to these characteristics the medium is easily realizable since, as we will see later, the depth of the reliefs to be used is in the region of those usually standardized for CD or DVD discs.

According to another aspect of the invention, a method for making the above type of medium is planned, characterized in that, on a transparent substrate, said method involves the following steps:

a) placing a layer of photopolymerizable monomer material on the substrate;

b) applying to said layer a stamper, bearing the data to be recorded in the corresponding bearer plane, to spread said material;

c) photopolymerizing said material using an appropriate light source;

d) repeating steps a), b) and c) on each polymerized layer to obtain new data bearer planes.

It can thus clearly be seen that the realization of a medium according to this invention simply involves adapting the already known 2P technology.

According to yet another aspect of the invention, an optical system is planned for reproducing the data recorded in different data bearer planes of a multilayer recording medium in which reading is performed in transmission, said data being recorded, in each plane, in the form of slightly phase-shifting information elements and each layer consisting of a near-transparent layer, said system comprising:

lighting devices to project onto said medium a laser beam focused on the plane to be read;

reception devices to collect the beam after crossing said medium;

detection devices receiving the beam collected by said reception devices to provide a reading signal;

drive devices to ensure the displacement of said medium in relation to said laser beam so as to be able to read all the data recorded in the plane to be read;

said system being characterized in that said detection devices operate in far fields and in that they are associated with filtering devices to only detect low frequency spatial components in the transmitted beam.

Furthermore, said detection devices are intended for a push-pull type reading of said information elements.

Thanks to these devices, slightly diffracting information can be read whilst eliminating cross talk with defocused layers.

The invention will be easier to understand and other characteristics and advantages will be shown through the following description and attached drawings where:

In the rest of the description, it will be assumed that the recording medium according to the invention is a disc. It should be clear, however, that any other type of medium (board, band, chip) can potentially be used for this invention.

As briefly explained above, the invention is based on a new concept in which each layer of a medium for recording optically readable data is read in transmission through a slightly phase-shifting information plane. The invention is based on the ability of these planes to generate a relatively significant disturbance of the transmitted beam while diffracting only a very small part of the light passing through them. This paradox is due to the fact that the power diffracted by each layer is proportional to the square of the phase shift caused by the diffracting information elements whereas the amplitude of the pattern of interference with the beam is directly proportional to this phase shift.

Figure 1:
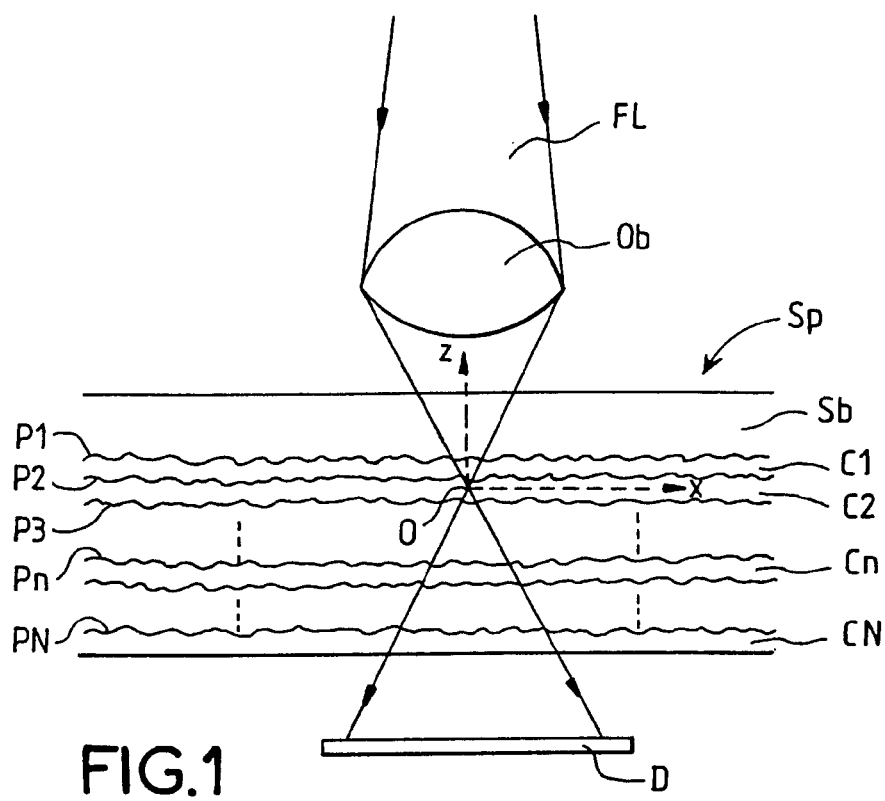
FIG. 1 is a schematic diagram for a medium according to the invention.

FIG. 1 shows the principle for such a medium (Sp). This medium is made up of a stack of N layers (C1 to CN), on the interfaces of which diffracting elements are placed to form data bearer planes (P1 to PN). These layers are carried on a transparent substrate (Sb). They are read using a laser beam (FI) focused on the plane to be read by an objective lens (Ob). The transmitted beam is received by a detecting device (D). The Oz axis is the focus axis for the device, perpendicular to the bearer planes, and the Ox axis defines the tangential displacement direction of the disc.

If, by way of example, we say that an information element introduces a phase shift in the region of 10 mrad, this can produce a disturbance of the transmitted beam in the region of 4%, whereas the light diffracted is just 0.01%. It can therefore be seen that this would theoretically allow the stacking of thousands of layers, disc thickness permitting.

This phenomenon can be justified by looking at the electrical field associated with the optical wave. A phase shift of 10 mrad corresponds to an electrical field signal 100 times less than the incident beam field. Its energy, however, is 10,000 times less than that of the incident beam and could not be detected by classic devices. However, by making this electrical field signal interfere constructively or destructively with the transmitted beam, the signal received by a detector is $(1+0.01)^2$ or $(1-0.01)^2$ respectively, an amplitude 400 times greater than that which would be detected in the absence of any interference. Great benefit can be obtained from this interference procedure using a push-pull type reading in which the "front-rear" halves of the transmitted beam are compared for energy. Put another way, the amplitude of the push-pull reading being proportional to the phase shift (and not to its square like in central aperture reading), lots more small phase shifts can be detected. For example, supposing we have a detector with an energy equivalent in noise to 1000 photons and a data flow in the range of 30 Mb/s, bearing in mind that a small blue laser source provides $10^{15}$ photons per second, even a phase shift of one milliradian provides sufficient modulation. In fact, as has already been indicated, the information element phase shift needs to be low for it to be possible to stack a large number of layers. But, when around a hundred layers are crossed, it has been noted that the signal read is not significantly degraded as long as the phase shift is below approximately 150 mrad. More precisely, in the current description, "slightly phase-shifting" information elements refers to elements creating a phase shift of less than a few hundred mrad.

In practice, discs are preferably created using polymers with an index of between 1.45 and 1.6 for the various layers. As the use of a plasticizer in a polymer allows the index to be modified by a few hundredths, a phase shift of 50 mrad can be obtained by modifying the index from one layer to the next by 0.05 and making reliefs 100 nm deep. This value is fully compatible with the known procedures for making optical discs. It is clear that it is not possible to introduce an index variation of the same sign on each interface. It is therefore preferable to alternate the materials on each interface, preferably by alternating the quantity of plasticizer used on the same polymer material.

The previous calculation shows that the disc can be read with a modulation contrast of around 20%, more than enough for using a laser of a few milliwatts.

The problem that still remains is that of the influence of the defocused layers on the reading of data on the plane to be read where the beam is focused, given that reading in transmission implies that the light beam crosses all the layers.

Figure 2:
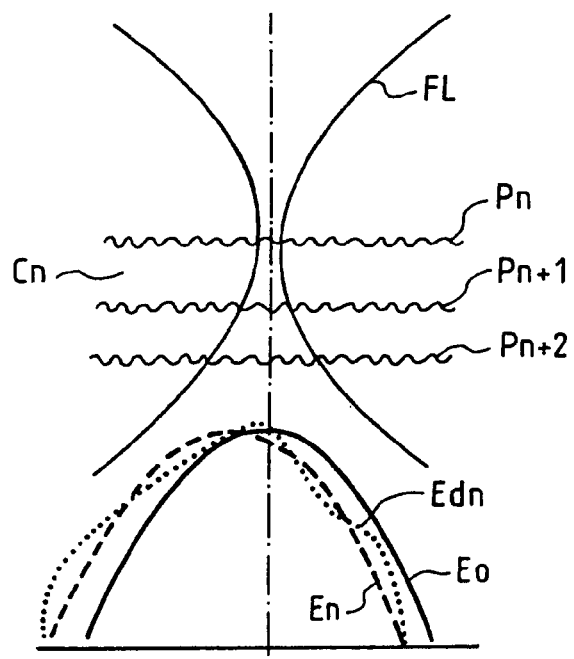
FIGS. 2 and 3 are diagrams illustrating the disturbances caused to the light beam by non-focused information layers.

FIG. 2 is a diagram illustrating this influence. The beam FI is shown focused on the data bearer plane Pn. At the bottom of the figure the resulting light curves in far fields are shown. Curve Eo represents the light of the original beam, curve En shows the forward-backward displacement of this light due to the contribution of plane Pn on which the beam is focused. Curve Edn shows the contributions of the defocused planes Pn+1 and Pn+2. The more a layer is defocused, the higher the spatial frequencies of the disturbances caused.

Figure 3:
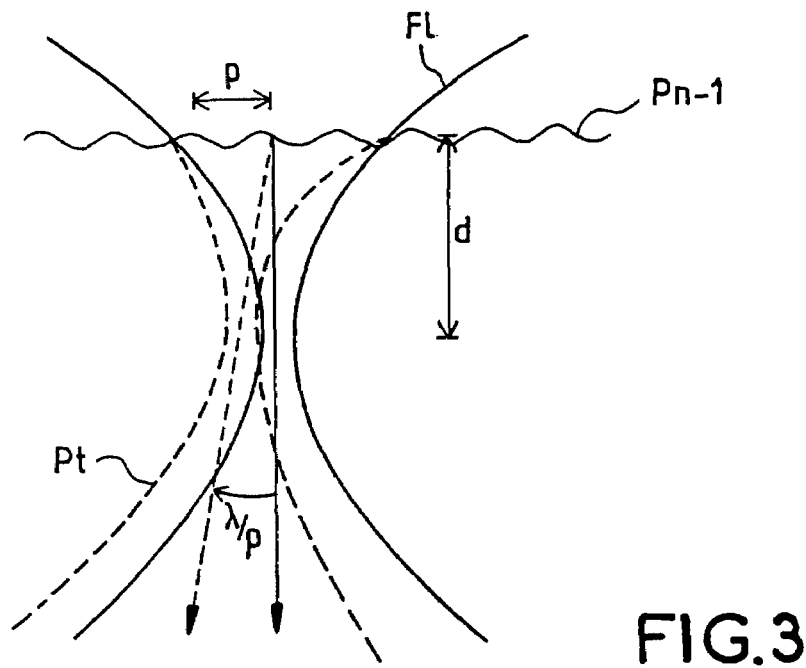

In FIG. 3, the diagram shows how to calculate more rigorously the angular spatial frequency of the disturbance caused by a plane Pn−1, defocused by distance d, adjacent to the focused plane. The beam FI crossing this plane generates two diffracted orders of directions ±λ/p, where p designates the period of a data component of the plane Pn−1 and λ the wavelength of the light used. FIG. 3 only shows, in a dotted line, one of the diffracted orders of the disturbance Pt. The phenomenon therefore corresponds to the interference of three remote sources of ±d (λ/p), hence a beat angular frequency ±d/p. It can therefore be seen that the angular frequency of the disturbance is, in far fields, proportional to the product of the defocusing distance by the recorded spatial frequency.

According to the invention, parasite interference is eliminated by only detecting the low spatial frequencies of the transmitted beam.

Figure 4:
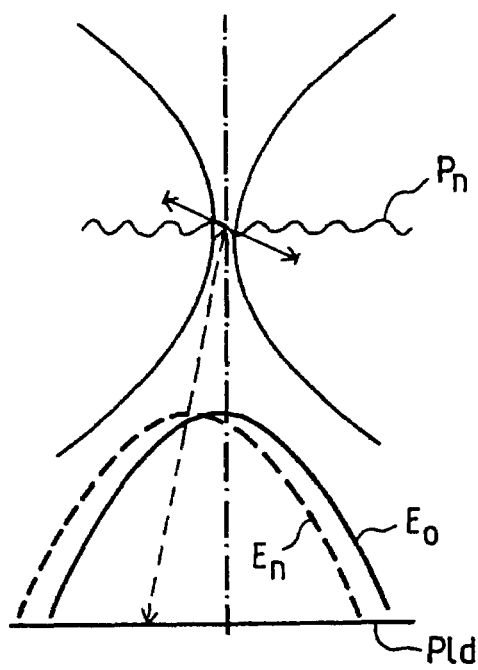
FIG. 4 is a diagram showing the effects of an information component passing into the beam focus plane.

FIG. 4 is a diagram showing the effect of a data component passing through the focusing plane. The effect of the edges of this component of plane Pn can be seen as an infinite angular displacement of the field to the value $2\pi\Delta/p$, where $\Delta$ is the deformation amplitude of the wave front. We see the light Eo of the original beam and the contribution En of the focused plane Pn in the detector plane Pld. The transmitted beam therefore undergoes two types of deformation, a significant forward-backward displacement of the data running past the reading spot and disturbances for which the minimum angular spatial frequency is proportional to the minimum distance between data bearer planes and to the minimum spatial frequency of the data. Therefore, by ensuring a minimum distance between data planes and by not recording spectral components below a pre-determined value it is possible, as already mentioned above, to eliminate the cross talk between layers by only detecting low angular frequency components of the transmitted beam.

Figure 5:
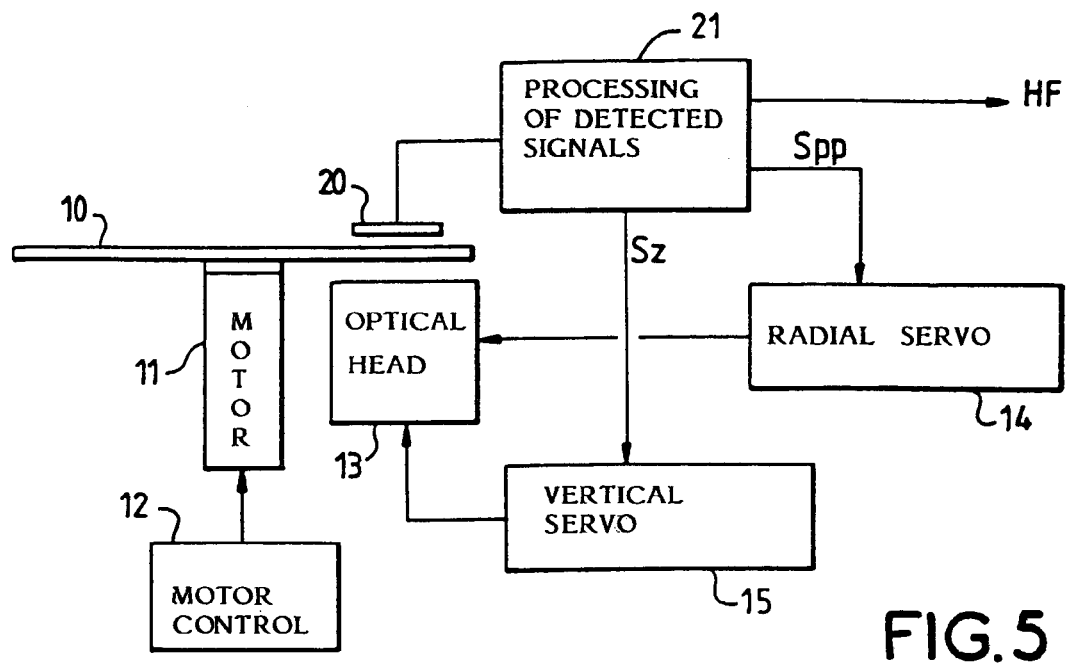
FIG. 5 is a schematic diagram for an optical reading system according to the invention.

FIG. 5 is an overview diagram of the optical reading system for a medium according to the invention. This system for reading the disc (10) conventionally includes a drive motor (11) to rotate disc 10, and its control (12), an optical head (13) providing a focused laser beam and a detecting device (20). The signals from device 20 are sent to a signal processing unit (21), the components of which will be specified later. This unit 21 extracts a reading signal (HF), a radial tracking error signal (Spp) and a focusing error signal (Sz), which are needed for point-to-point reading. The Spp signal controls a radial servo (14) and the Sz signal controls a focus servo (15) which controls the optical head 13. The diagram shows a simple transmission reading, the detectors and the optical head being on either side of the disc.

Figure 6:
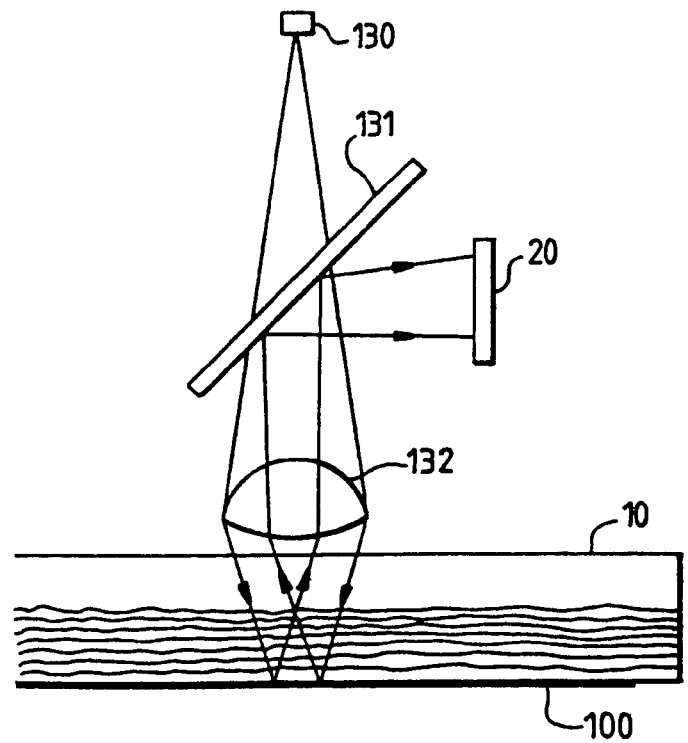
FIG. 6 is a schematic diagram for a reading system according to the invention adapted for reading by reflection.

However, without in any way changing the transmissive character of the reading, it is possible to use the set-up shown in FIG. 6, where disc 10 has a side facing the metallized and reflective input diopter.

FIG. 6 shows the disc (10) with its metallized layer (100) and the optical head used. Here there are the items traditionally found on a head, with a laser source (130), an objective lens (132), a semi-transparent mirror (131) and detectors (20). But unlike with a classic head, the beam is not focused on the reflecting plane but on one of the data bearer planes. Furthermore, the detectors are not located on a plane close to the return beam focus but are used in a far field.

The focusing can take place before or after the reflecting plane. For a read-only optical system, it is best if the focusing takes place after the reflecting plane since in this way the return beam, having a lower section than the incident beam, is entirely collected by the focusing objective lens without vignetting. Focusing before the reflecting plane can be an advantage when writing to a recordable disc, since the power focused on the layer to be engraved will be greater.

As has already been explained, it is necessary, in order to eliminate disturbances caused by defocused layers, to filter high spatial frequencies in the collected beam so as to only retain the low angular frequencies. It has been shown that a gentle transition between the front and rear parts of the detector is appropriate for this.

Figure 7:
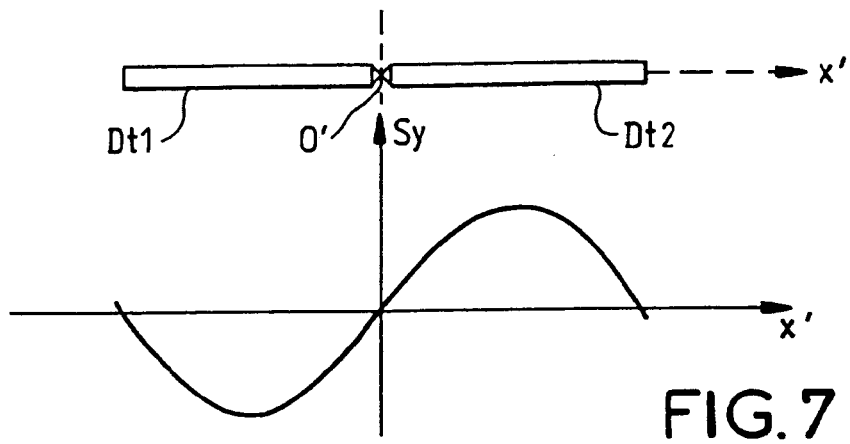
FIG. 7 shows the filtering function adopted according to the invention.

FIG. 7 shows this function by representing, below the front detector (Dt1) and rear detector (Dt2), the ideal profile for detector sensitivity (Sy), the O'x' axis being the projection in the detector plane of the data displacement direction (Ox). This resulting detection sensitivity curve is an antisymmetric curve thus showing symmetry with regard to the center (O') of the beam. Maximum sensitivity is obtained by taking the difference between the candle powers received on the front and rear halves of the beam. But an abrupt transition when moving from one detector to another will mean that disturbances due to neighboring layers of the focused layer will be seen on transition. To obtain a smoothing of the push-pull function and resolve these disadvantages, absorption of the central part of the beam is planned.

Figure 8:
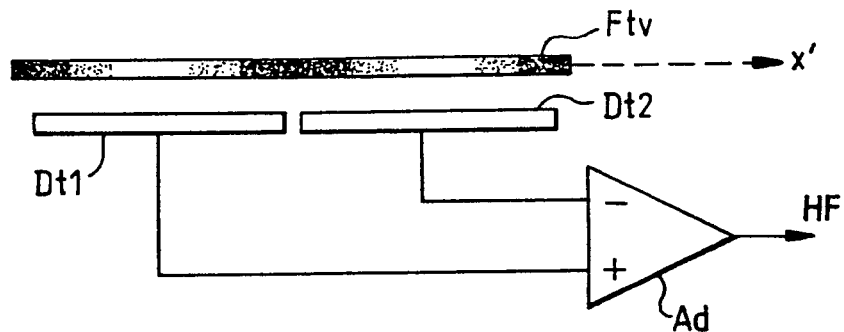
FIG. 8 is a first filtering method using a variable transparency filter.

FIG. 8 represents the possibility of implementing this idea. A variable transparency filter (Ftv) is planned, before the detectors (Dt1) and (Dt2), offering maximum absorption at the center and at the edges of the beam in the direction O'x' (shown by the black areas in the diagram), in other words these areas are made up of parallel bands, perpendicular to the plane in the Figure. The filter Ftv provides maximum transparency in a direction where the intensity of the transmitted beam is about half the intensity at the center, in other words it is more or less centered on the front and rear edges of the beam.

The transition between areas with different transparencies is shown in the areas with dotted lines. To obtain a sensitivity curve similar to that shown in FIG. 7, the difference is made between the signals from the front (Dt1) and rear (Dt2) detectors using a differential amplifier Ad providing the push-pull reading signal (HF).

Figure 9:
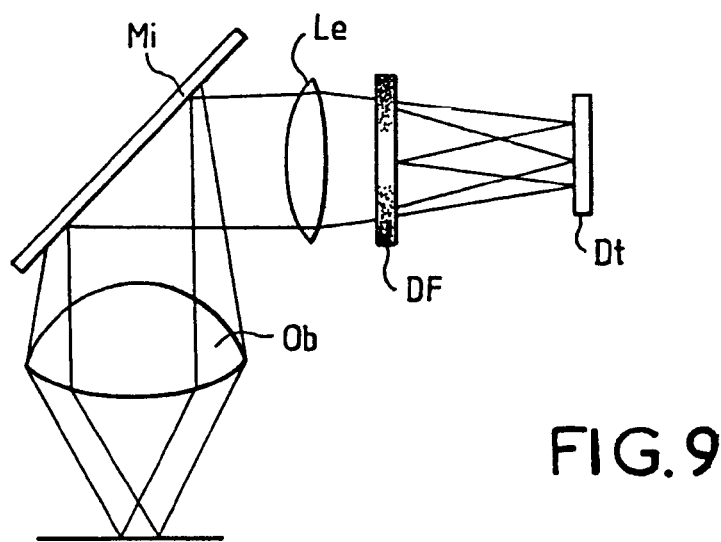
FIGS. 9 and 10 show another filtering method using a diffracting device.
Figure 10:
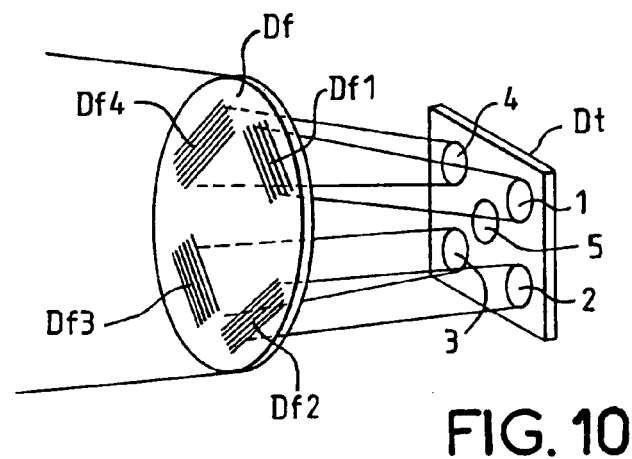

FIGS. 9 and 10 show a particularly interesting method for making the optical reading system according to the invention. On the path of the collected beam deviated by the semi-transparent mirror (Mi), after the optical lens (Le) which focuses the beam in the vicinity of the detectors (Dt), a diffracting device (Df) is inserted, which includes a number of diffracting elements (Df1 to Df4), which deviate the collected light to the individual detectors (1 to 4). This diffracting device is adjusted to diffract the light towards the detectors at the intensity required so as to correspond to the function represented in FIG. 7. It should preferably be made in a holographic form, so as to individually determine both the direction of the beams and their intensity. By allowing for four beams and four detectors placed appropriately, representative signals can be obtained for the front-rear and right-left parts of the beam, so as to obtain in the latter case a classic push-pull radial tracking signal. Furthermore, it is possible to allow for a fifth central beam directed towards a detector (5) to obtain various service information (disc presence, classic disc compatibility, user information, etc.).

Figure 11:
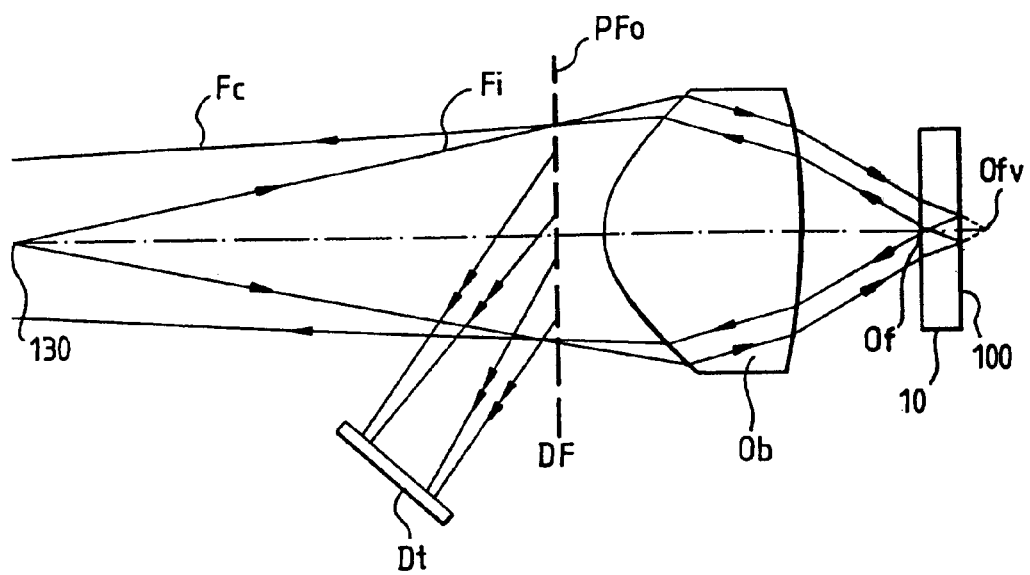
FIG. 11 shows an advantageous position according to the invention of the filtering devices.

FIG. 11 shows a particularly advantageous positioning for the filtering devices or the diffracting device according to the invention. As shown in FIG. 11, the section of the collected beam is constant, irrespective of the data bearer plane on which the beam is focused, in a plane (Pfo) near the objective lens (Ob) (or its plane conjugated with the semi-transparent mirror) and after this, in the propagation direction of the collected beam (Fc). This plane is the focal plane of the objective lens. It is therefore preferable to position the diffracting device (Df) in this plane. It is also preferable to use the diffracting device to simultaneously carry out the mirror function and the diffracting function deviating the beams towards the individual detectors (Dt) and determining their intensity.

Figure 12:
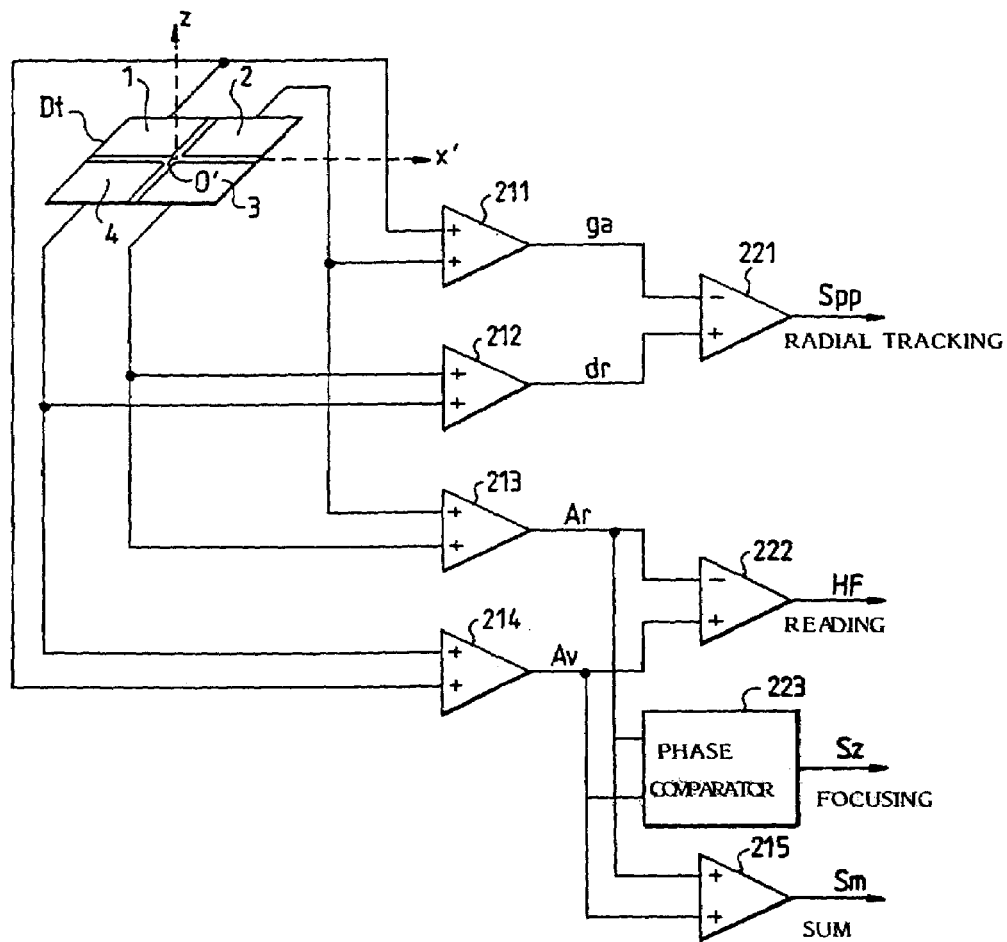
FIG. 12 is a diagram of the circuits for processing the signal detected in a reading system according to the invention.

FIG. 12 is the diagram showing how to make circuits for processing signal 21 from FIG. 5 in the case of a classic detector device (Dt) with four detectors (1 to 4). These detectors are set out on a perpendicular plane to the optical axis (Oz) of the collected beam, aligned in pairs according to the O'x' projection in this plane of the Ox displacement direction of the medium and positioned symmetrically with regard to said optical axis Oz and to said projection O'x'. Detectors 1 and 4 are the front detectors and detectors 2 and 3 are the rear detectors. Signals from detectors 1 and 4 on the one hand and 2 and 3 on the other hand are summed by summing circuits 214 and 213 respectively, providing front (or forward) (Av) and rear (or backward) (Ar) signals respectively. Signals from detectors 1 and 2 on the one hand and 3 and 4 on the other hand are summed by summing circuits 211 and 212 respectively, providing left (ga) and right (dr) signals respectively. The push-pull reading signal (HF) is provided by a differential amplifier 222 making the difference between signals Av and Ar. A radial tracking error signal (Spp) is provided by a differential amplifier (221) providing, in the conventional way, a push-pull signal difference between signals dr and ga. A focusing error signal (Sz) is provided by a phase comparator (223) which receives the Av and Ar signals, as will be explained below. Finally, a summing circuit (215) provides the sum (Sm) of all detection signals, for an alternative use which will be explained later.

The circuit (223) for determining the focusing error signal works on the following principle derived from the system described in French patent N° 2 280 150 proposing the focusing of the beam on the data itself. This operation can be summarized by considering that the amplitude modulation on the disc acts as a Foucault's knife edge. Its shadow moves in the direct or inverse direction of the disc displacement when the focus point is respectively before or after the data plane. Although this solution cannot be used directly for a disc according to the invention, which only has a pure phase modulation, it can nonetheless be seen that the aim of this multilayer structure is that virtually no candle power be diffused outside the main beam by each layer. As a result the sum of the front and rear halves of the beam is constant and the modulations for each half of the beam are in exact phase opposition, regardless of the defocusing, which would make it impossible to use these signals to correct the defocusing.

However, we have seen that the smoothing of the push-pull reading function weakens the sensitivity of the detectors at the center of the beam.

The applicant has noted that in the presence of this central absorption of the beam, a phase shift appears between the front and rear modulations of the beam which passes through the value π to the exact focus point. A usable focusing error signal can therefore be deduced.

The phase comparator 223 determines this.

Figure 13:
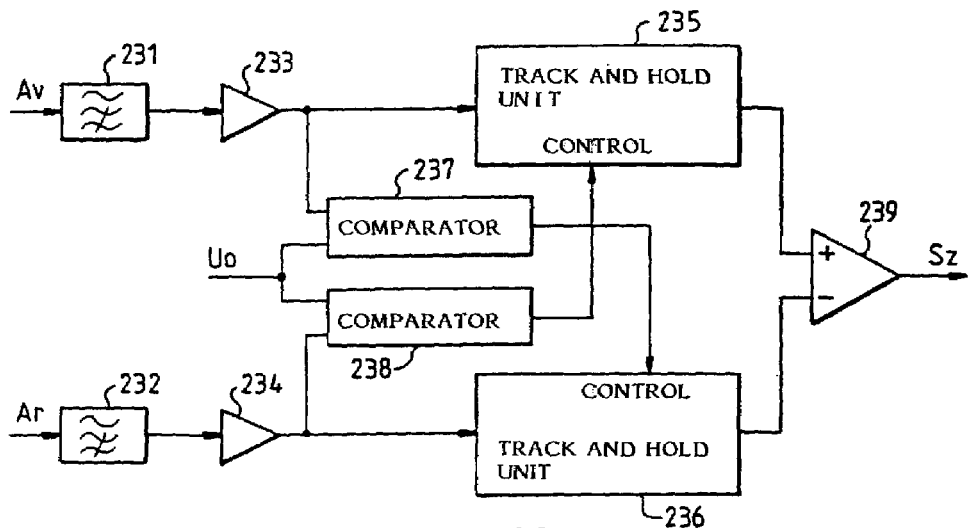
FIG. 13 is a possible way of realizing the focus control circuit.

FIG. 13 is an example of the realization of a phase comparator providing the focusing error signal (Sz). Signals (Av) and (Ar) are high-pass filtered (231, 232), then amplified (233, 234). They are then sent to track and hold units (235, 236). These are controlled by the signal reshaped by the comparators (238, 237) of the other channel. A differential amplifier (239) which receives the signals from circuits (235) and (236) provides the error signal (Sz) proportional to the phase shift of signals Av and Ar.

Figure 14:
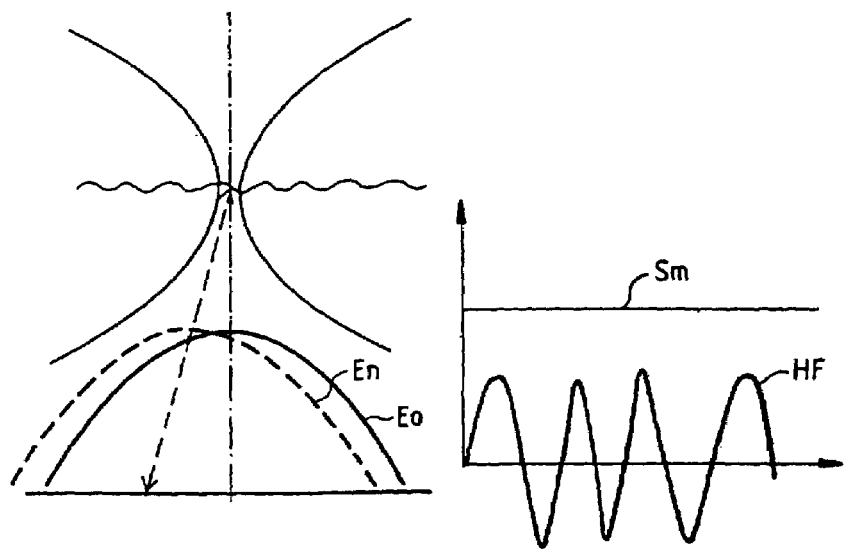
FIGS. 14 and 15 are diagrams illustrating another focus control method.

Another possibility for obtaining the focusing error signal lies in the use of the sum signal of all the detectors. The intensity at the center of the beam transmitted by the disc is, in the absence of any defocusing, equal to the integral of the field at the focus of the beam. The amplitude of this integral is slightly affected by the presence of slightly phase-shifting reliefs. The sum signal (Sm) is then more or less constant as can be seen in FIG. 14 where the data bearer plane is correctly focused, which only results in horizontal travel in a far field (curve En).

Figure 15:
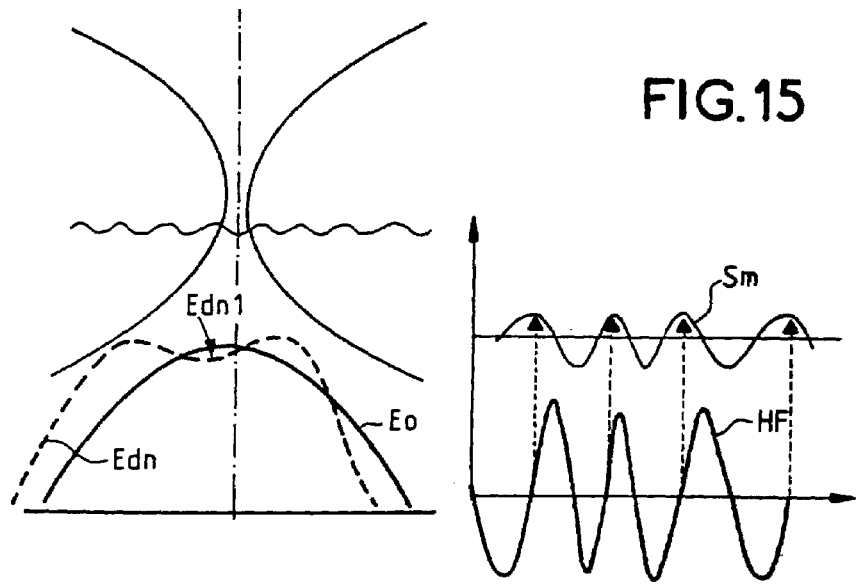

In the presence of significant defocusing, this same intensity is the integral of a wave surface in the form of a spherical cap for which the presence of a slightly phase-shifting point in the center of the cap increases or decreases the value of the integral according to whether this phase shift tends to reduce or amplify the deflection of the spherical cap. A reduction in the deflection results in a concentration of the light at the center of the far field and therefore a decrease in the light seen by the detectors for which the sensitivity is cancelled out at the center. Inversely, an increase in the deflection reduces the illumination at the center and increases the sum signal of the cells. This sum signal (Sm) is thus modulated by a component in a rear or front quadrature, depending on the direction of the defocusing, in relation to the push-pull reading signal (HF) as can be seen in FIG. 15. In this Figure, the effect of the defocusing on curve Edn is horizontal travel in a far field accompanied by a central pit Edn1.

The focusing error signal (Sz) can therefore be obtained by comparing the sum signal (Sm) (output of 215, FIG. 12) sampled on the leading and trailing edges of the HF signal (output of 222, FIG. 12), the direction of the phase shift giving the sign of the defocusing and the amplitude of the Sm component measuring the extent of the defocusing. It is worth noting that the sign for this error signal depends on the rotation direction of the disc but does not depend on the sign of the phase-shift caused by the engraving.

Figure 16:
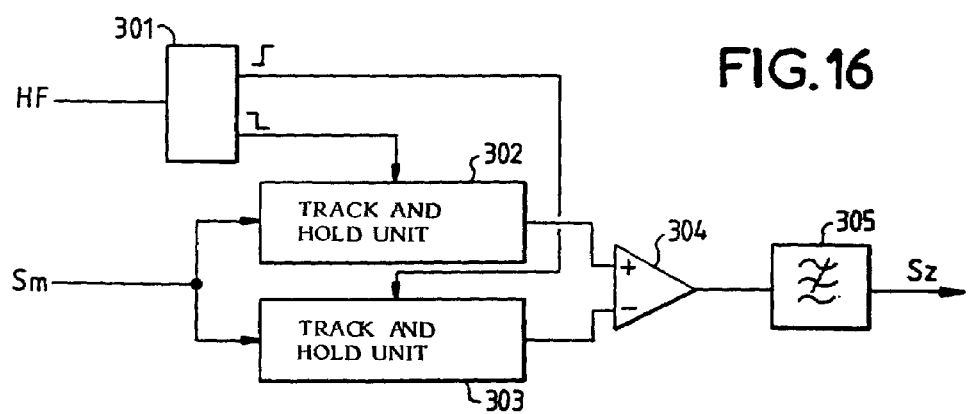
FIG. 16 is a realization method corresponding to a focus control circuit.

FIG. 16 shows an example of an electronic circuit corresponding to this mode of detection. The leading and trailing edges trigger track and hold units 302 and 303 respectively, for which the mean difference, obtained at the output of a differential amplifier (304) followed by a low-pass filter (305), provides the defocusing data (Sz).

The question of the practical realization of a multilayer recording medium according to the invention has been briefly dealt with. The general structure for the medium (10) is shown again in FIG. 17. On a transparent substrate (101) there are N layers (110), the interfaces of which bear slightly phase-shifting information elements. It is assumed here that the disc is read by reflection, so the last layer is metallized (100) and covered with a protective coating (102), if necessary containing screen-printed indications.

As has been explained, each data bearer plane is made at the interface between two dielectric layers of slightly differing refractive indices, which allows the use of diffracting relief depths in the order of those of known optical discs. Therefore, the known procedures for making stampers, electro-plating and molding, can be used. But the duplication should preferably be carried out by a photopolymerization process (2P). As has already been mentioned, the refraction indices of the current polymers varies from 1.45 to 1.6 and can be modified slightly using a plasticizer. As it is not possible to introduce an index variation with the same sign on each interface (100 layers would give an index increase of 5 for a variation of 0.05 between two adjacent layers), it is preferable to alternate the materials on each interface. There is then an additional advantage with the focus servo signals. Error signals can in fact be obtained for which the direction depends on whether the reliefs have a lower or higher index. Odd and even layers can also be recognized and one or the other can be controlled by alternating the direction of the servo loop.

It is obviously essential for the invention to keep the space between each data bearer plane constant.

Figure 18:
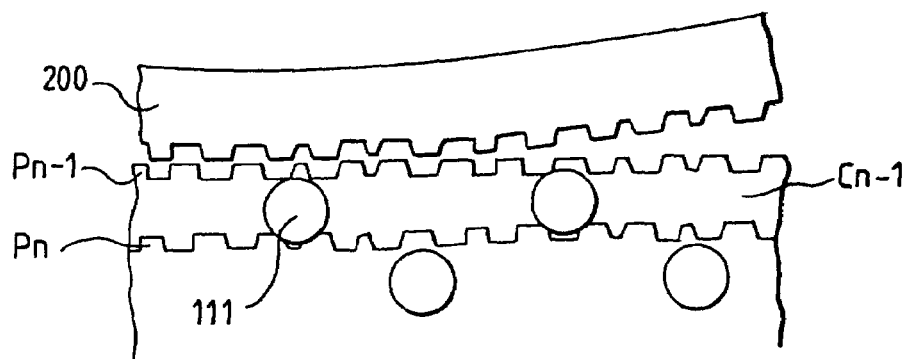

FIG. 18 shows a first procedure for this. To form the layer Cn−1 with the bearer plane Pn−1, calibrated microcylinders or microbeads (111) (similar to those used in liquid crystal cells) are added to the monomer that is to be spread on the previously created plane (Pn). A calibrated body density in the region of 100 ppm is sufficient as these bodies and the substrate can withstand local pressure of around a Gigapascal, whereas the stamper (200) is applied to the monomer with a pressure of around 10 Kilopascals, sufficient to spread the liquid monomer and print the reliefs. The layer is then polymerized using a light source, generally an ultraviolet one. The stamper (200) is then removed and the operations are repeated for layer Cn−2. The faults introduced by these calibrated bodies during reading are minimal and can be corrected using an error-correcting code. If the index for these spacers is correctly chosen, it is even possible not to introduce any errors at all.

Figure 19:
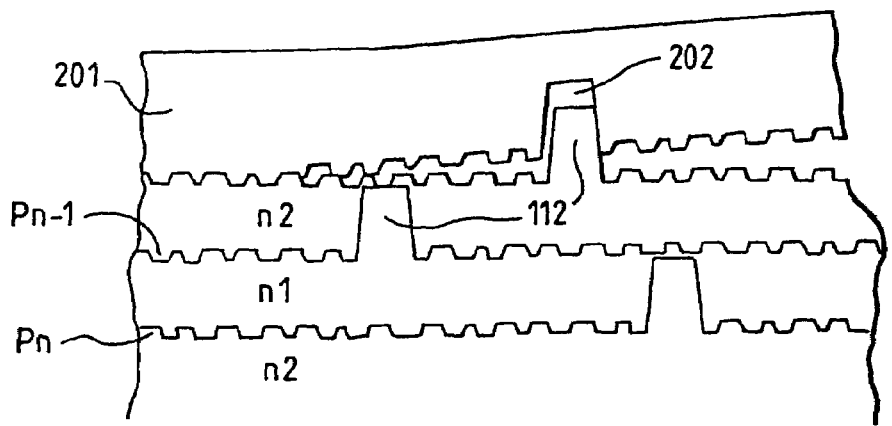
Figure 20:
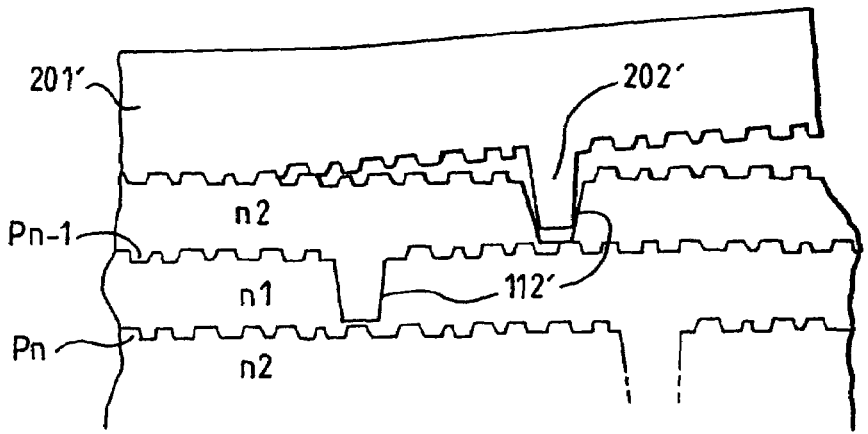

FIG. 19 shows a variant on the procedure for making the medium according to the invention. In this variant, stampers (201) contain holes with a calibrated depth (202). After replication, the polymeric material has formed protuberances (112) which will be used as spacers for making the next layer. The relative surface of the holes or protuberances can be in the region of 10 ppm. They can be placed in areas chosen not to contain any data. Of course, these holes are placed differently from one stamper to the next to avoid the protuberances being systematically facing the holes of the following stamper. As shown in FIG. 20, stampers (201') can on the contrary contain calibrated protuberances (202') pressed against the already formed lower layer and leaving pits (112').

Figure 17:
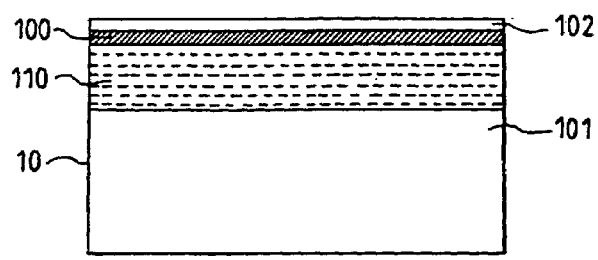
FIGS. 17 to 20 are diagrams illustrating several variants of a procedure for realizing the medium according to the invention.

Returning to the medium in FIG. 17, it can be noted that it is also possible to make the last layer receiving the metallization (100) according to reliefs and a format corresponding to an existing standard for layers read by reflection so as to ensure compatibility for a minimum part of the data. The reading of the other layers in transmission could be carried out by the non-diffracting reflection of the zeroth order of the beam which makes up a sufficient part of the reading of all the other layers.

Of course, the invention is not limited to the examples described and, in particular, the digital values cited can vary to a large degree. However, the number of layers should always be limited to around a hundred, given the variations in thickness to be crossed between the first and last layers. For a red DVD type optical reading head, the layers can be spaced by approximately 4 μm, and by 2 μm for the future blue DVD standard type. It is also clear that the push-pull reading type preferably used provides another major advantage, namely that this type of reading does not require the presence of land sections between the tracks, hence there is a considerable improvement in the disc capacity. In an interesting variation, the width of the track is chosen to be half the diameter of the first black ring of the Airy's pattern of the reading beam. The contribution to the cross talk of adjacent tracks is therefore minimized.

The invention claimed is:

1. Recording medium for optically readable data in transmission obtained by engraving diffracting elements on at least one data bearer plane, the recording medium comprising:

superposing planes bearing phase-shifting information elements, each superposing plane separated from a next superposing plane by a near-transparent layer, wherein the recording medium is readable in transmission using a light beam focused on the at least one data bearer plane to be read and crossing the superposing other planes and each near-transparent layer, the data being read by detecting focused light transmitted through the data bearer plane, the focused light transmitted through the data bearer plane indicating the data.

2. Recording medium according to claim 1, wherein the phase shift introduced by the information elements is less than a few tenths of a radian.

3. Recording medium according to claim 1, wherein each data bearer plane is made at an interface between two dielectric layers of differing refractive indices, the refractive indices differing by a few percent, and wherein the information elements are made up of reliefs of the interface.

4. Recording medium according to claim 3, wherein the reliefs have a depth of approximately a hundred nanometers.

5. Recording medium according to claim 3, wherein the dielectric layers are alternated from one interface to a next interface, so as to alternate a step index sign from the one interface to the next interface.

6. Recording medium according to claim 3, wherein the dielectric layers include calibrated microcylinders or microbeads used as spacers to keep a space between each data bearer plane constant.

7. Recording medium according to claim 3, wherein each of the dielectric layers includes a polymer material.

8. Recording medium according to claim 7, wherein each of the dielectric layers includes a same polymer material, and wherein a refractive index control for each dielectric layer is carried out by a predetermined addition of a plasticizer.

9. Recording medium according to claim 1, wherein one of external faces of the recording medium is metallized to allow reading by reflection from another face of the recording medium.

10. Method for making a medium according to claim 3, wherein, on a transparent substrate, said method comprises:
   a) placing a layer of photopolymerizable monomer material on the substrate;
   b) applying to the layer of photopolymerizable monomer material a stamper, bearing the data to be recorded in a corresponding data bearer plane, to spread the layer of photopolymerizable monomer material;
   c) photopolymerizing the photopolymerizable monomer material using an appropriate light source;
   d) repeating operations a), b), and c) on each polymerized layer to obtain new data bearer planes.

11. Method for making a medium according to claim 10, wherein, in the photopolymerizable monomer material of each layer, calibrated microcylinders or microbeads are added to ensure a predetermined gap between each data bearer plane.

12. Method for making a medium according to claim 10, wherein each stamper contains holes with a depth calibrated to make protuberances after photo-polymerization, allowing a following stamper to be positioned, positioning of the holes being different from one stamper to a next stamper.

13. Method for making a medium according to claim 10, wherein each stamper includes protuberances of a height calibrated to allow the stamper to be positioned in relation to a previously made data bearer plane.

14. Method for making a medium according to claim 10, wherein a last layer of the recording medium is metallized and protected by a coating so that the recording medium can be read by reflection.

15. Method for making a medium according to claim 14, wherein the metallized layer bears data according to a classic standard for layers read by reflection.

16. Optical system for reproducing data recorded in different data bearer planes of a multilayer recording medium in which reading is performed in transmission, the data being recorded, in each data bearer plane, in a form of phase-shifting information elements and each layer including a near-transparent layer, said system comprising:
lighting devices configured to project onto the recording medium a laser beam focused on the data bearer plane to be read;
reception devices configured to collect the laser beam after crossing the recording medium;
detection devices configured to receive the laser beam collected by the reception devices to provide a reading signal;
drive devices configured to ensure displacement of the recording medium in relation to the laser beam to be able to read the data recorded in the data bearer plane to be read;
wherein the detection devices operate in far fields, and wherein the detection devices are associated with filtering devices to only detect low frequency spatial components in the laser beam.

17. Optical system according to claim 16, wherein the detection devices are further configured for a push-pull reading of the information elements.

18. Optical system according to claim 16, wherein the filtering devices are configured to ensure an antisymmetric sensitivity curve for a resulting detection presenting a value of close to zero around a center of the laser beam and at edges and symmetry with regard to the center of the laser beam.

19. Optical system according to claim 18, wherein the detection devices include at least two detectors, on a perpendicular plane to an optical axis of the collected laser beam, aligned according to a projection in the perpendicular plane of a displacement direction of the recording medium and positioned symmetrically with regard to the optical axis, wherein the filtering devices include a variable transparency filter, with near-zero transparency at a center and edges and maximum transparency centered around front and rear edges of the laser beam or reflected by the recording medium, and wherein devices for comparing a phase of signals from the two detectors provide a signal that acts as a focusing error signal configured to control focusing of the laser beam provided by the lighting devices.

20. Optical system according to claim 17, wherein the detection devices include four detectors, set out on a perpendicular plane to an optical axis of the collected laser beam, aligned in pairs according to a projection in the perpendicular plane of a displacement direction of the recording medium and positioned symmetrically with regard to the optical axis and to the projection, the system further comprising:
two first electronic summing circuits configured to sum respectively signals from detector pairs that are symmetrical with regard to the projection;
a first differential amplifier receiving sums of the two first electronic summing circuits to generate a first difference signal, which constitutes a reading signal of the data recorded in the data bearer plane to be read;
devices configured to compare a phase of signals of the two first summing circuits to provide a signal that acts as a focusing error signal configured to control focusing of the laser beam provided by the lighting devices;
two second electronic summing circuits configured to sum respectively signals from detector pairs on either side of the projection; and
a second differential amplifier receiving sums of the two second electronic summing circuits to generate a second difference signal, which constitutes a radial tracking signal of the data recorded in the data bearer plane to be read.

21. Optical system according to claim 17, wherein the detection devices include four detectors, set out on a perpendicular plane to an optical axis of the collected laser beam, aligned in pairs according to a projection in the perpendicular plane of a displacement direction of the recording medium and positioned symmetrically with regard to the optical axis and to the projection, the system further comprising:
two first electronic summing circuits configured to sum respectively signals from detector pairs that are symmetrical with regard to the projection;
a first differential amplifier receiving sums of the two first electronic summing circuits to generate a first difference signal, which constitutes a reading signal of the data recorded in the data bearer plane to be read;
two second electronic summing circuits configured to sum respectively signals from detector pairs on either side of the projection;
a second differential amplifier receiving sums of the two second electronic summing circuits to generate a second difference signal, which constitutes a radial tracking signal of the data recorded in the data bearer plane to be read;
a third electronic summing circuit configured to sum signals from the four detectors;
devices configured to detect a sum signal component provided by third electronic summing circuit which is in quadrature with the reading signal provided by the first differential amplifier, to deduce a focusing error signal configured to control focusing of the laser beam provided by the lighting devices.

22. Optical system according to claim 20, wherein the filtering devices include a variable transparency filter.

23. Optical system according to claim 17, wherein the filtering devices include a diffracting device, placed in a path of the collected laser beam, such that a diffracted intensity corresponds to a predetermined sensitivity curve.

24. Optical system according to claim 23, wherein the diffracting device includes plural diffracting elements configured to break the collected laser beam down into a series of individual laser beams directed respectively to the detectors.

25. Optical system according to claim 24, wherein the diffracting device further includes an additional element sending a central part of the collected laser beam to an additional detector to provide service information.

26. Optical system according to claim 23, wherein the lighting devices and the reception devices include a common objective lens used simultaneously to focus the laser beam on the data bearer plane to be read and to collect the laser beam after crossing the recording medium, wherein the diffracting device is positioned substantially in an object focus plane of the objective lens, after one in the propagation direction of the collected laser beam.

27. A method for making a medium for optically readable data in transmission obtained by engraving diffracting elements on at least one data bearer plane, the recording medium including, superposing planes bearing phase-shifting information elements, each superposing plane separated from a next superposing plane by a near-transparent layer, wherein the recording medium is readable in transmission using a light beam focused on the at least one data bearer plane to be read and crossing the superposing other planes and each near-transparent layer, and each data bearer plane is made at an interface between two dielectric layers of differing refractive indices, the refractive indices differing by a few percent, and wherein the information elements are made up of reliefs of the interface, said method comprising:

a) placing a layer of photopolymerizable monomer material on the substrate;

b) applying to the layer of photopolymerizable monomer material a stamper, bearing the data to be recorded in a corresponding data bearer plane, to spread the layer of photopolymerizable monomer material;

c) photopolymerizing the photopolymerizable monomer material using an appropriate light source; and d) repeating operations a), b), and c) on each polymerized layer to obtain new data bearer planes.

28. The method for making a medium according to claim 27, wherein, in the photopolymerizable monomer material of each layer, calibrated microcylinders or microbeads are added to ensure a predetermined gap between each data bearer plane.

29. The method for making a medium according to claim 27, wherein each stamper contains holes with a depth calibrated to make protuberances after photo-polymerization, allowing a following stamper to be positioned, positioning of the holes being different from one stamper to a next stamper.

30. The method for making a medium according to claim 27, wherein each stamper includes protuberances of a height calibrated to allow the stamper to be positioned in relation to a previously made data bearer plane.

31. The method for making a medium according to claim 27, wherein a last layer of the recording medium is metallized and protected by a coating so that the recording medium can be read by reflection.

32. The method for making a medium according to claim 31, wherein the metallized layer bears data according to a classic standard for layers read by reflection.

* * * * *